UNITED STATES PATENT OFFICE.

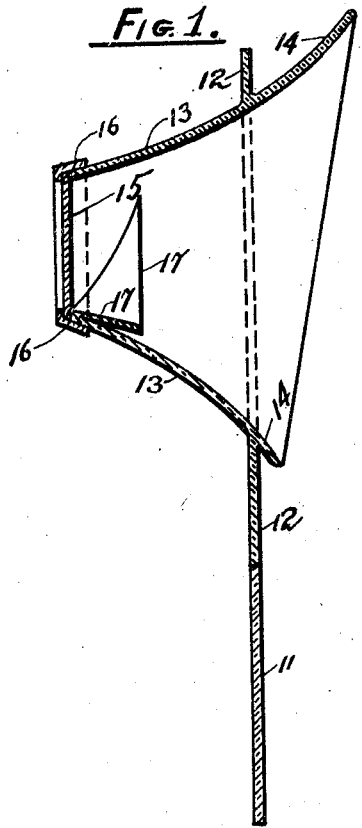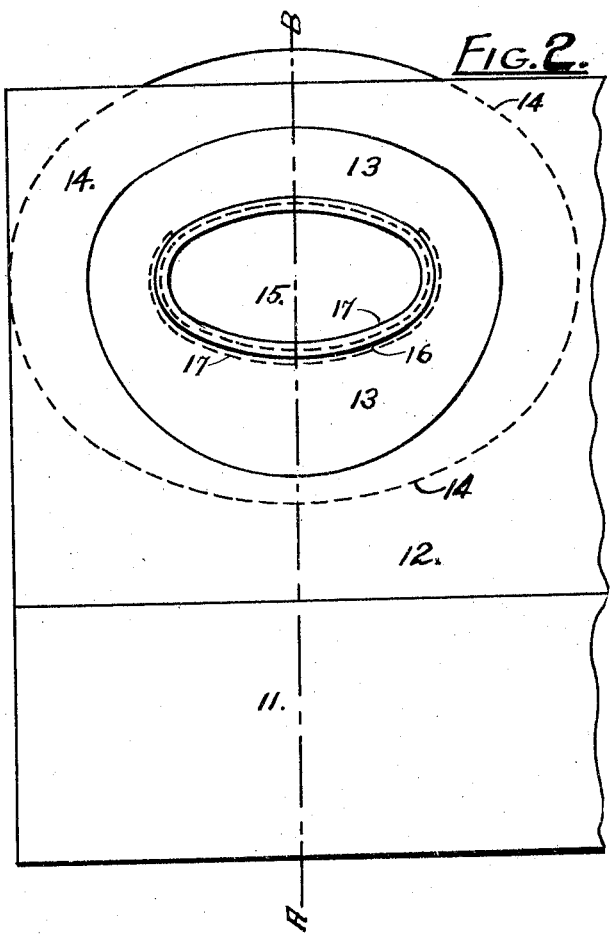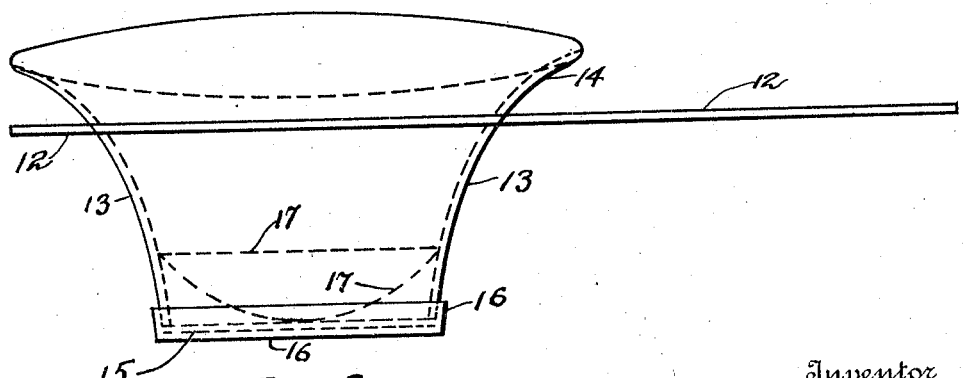

LAKE H. SPRINKLE, OF BROOKLYN, NEW YORK.

STORM-SHIELD FOR AUTOMOBILES AND OTHER CONVEYANCES.

1,361,193.  Specification of Letters Patent.  Patented Dec. 7, 1920.

Application filed April 7, 1920. Serial No. 371,975.

*To all whom it may concern:*

Be it known that I, LAKE H. SPRINKLE, a citizen of the United States, residing at 310 Carlton Ave., Brooklyn, in the county of Kings and State of New York, have invented a new and useful Storm-Shield for Automobiles and other Conveyances, of which the following is a specification.

My invention relates to storm shields which may be used for automobiles and other conveyances and which are commonly made of glass; it consists in the novel features, hereinafter more fully described.

The objects of my improvements are:

First, to make the shield secure against being obscured by the rain or snow in a storm striking the glass of the shield and adhering thereto.

Second, to have said storm shield act also as a windshield in ordinary weather, and Third, to have said storm shield simple, durable and inexpensive.

I attain these objects by the storm shield illustrated in the accompanying drawings or by any mechanical equivalent or obvious modification of the same.

In the drawings Figure 1 is a section on the line A—B of Fig. 2 looking toward the left; Fig. 2 is an elevation looking in the direction of motion of an automobile or other conveyances containing my storm shield; Fig. 3 is a plan of my storm shield.

Similar numerals refer to similar parts throughout the several views.

11 designates the lower section of a wind shield, the full length of which is shown in Fig. 3; 12 designates the upper section of the shield the left end of which is shown in Figs. 2 and 3 as having a trumpet shaped member 13 extending mainly toward the rear of the windshield 12 and having also a flaring hood 14 extending to the front of said shield 12.

15 is a spy glass which is shown as detachable, situated at the inner end of said member 13 and kept in place by a suitable ring 16, which may be detachable if desired and adapted to retain its position on the end of said member 13 by friction.

The member 13 with the hood 14 can be made long enough to prevent rain or snow from ever reaching the spy glass 15 at usual speeds of an automobile or other conveyances. The hood 14 serves to extend the length of the member 13 on the forward side of the windshield and is shaped to give an unobstructed view in all directions; the upper part of the hood 14 is so shaped as to permit a ready down flow of the rain water intercepted between it and the upper end of the windshield 12; and to prevent the rain water from following its inner outline toward the spy glass 15.

Said member 13 and said hood 14 are shown in Fig. 2 as made in one with said windshield 12; but they may also be made separate if desired.

17 is an inner curtain wall designed to intercept any drops of water reflected by the lower part of the inner walls of the member 13 and to prevent said water from striking the spy glass 15.

Said curtain wall 17 is shown in Figs. 1 and 2 as extending slightly above the middle of the sides of the member 13, and its depth gradually diminishes from the bottom of said member 13, where it is at a maximum to each of its two ends where it is at a minimum width.

The length of the member 13 and the hood 14 may be made greater than is shown in the drawing, also the relative size of the said member 13 and hood 14 as compared with said windshield 12 may be varied, if desired.

Many other changes could be made in my storm shield without departing from the main scope of my invention; I do not therefore, restrict myself to the details of my storm shield as shown in the drawings, but I intend to include also all mechanical equivalents and reasonably obvious modifications of the same within the scope of my invention.

What I claim as my invention, and desire to secure by Letters Patent is:

1. In a storm shield for automobiles and other conveyances, a trumpet shaped member having curved walls with inner convex surfaces, and terminating at its inner end in a spy glass, the walls of said member being adapted to intercept the rain and snow and to prevent them from reaching the spy glass.

2. In a storm shield for automobiles and other conveyances, a trumpet shaped member terminating at its inner end in a detachable spy glass adapted to permit the simultaneous use of both eyes by the operator, the walls of said member having inner convex surfaces adapted to intercept the rain and snow and to prevent them from reaching the spy glass, and a detachable ring adapted to keep said spy glass in place and to be retained in position at the end of said member by friction.

3. In a storm shield for automobiles and other conveyances, a trumpet shaped member extending to the rear of said shield and a flaring hood, having inner convex surfaces and extending at the front thereof, said member terminating at its rear end in a spy glass adapted to permit the simultaneous use of both eyes by the operator, and the walls of said member with said hood being adapted to intercept the rain and snow and to prevent them from reaching the spy glass.

4. A storm shield for automobiles, comprising an upper section and a lower section, said upper section having a trumpet shaped member formed integrally therewith, said member extending mainly to the rear of the plane of said upper section and terminating at its rear end in a spy glass adapted to permit the simultaneous use of both eyes by the operator, and the walls of said member being adapted to intercept the rain and snow and to prevent them from reaching the spy glass.

5. In a storm shield for automobiles and other conveyances a trumpet shaped member terminating at its inner end in a spy glass, the walls of said member being adapted to intercept the rain and snow and a curved curtain wall extending from the lower part and sides of said member inside thereof, the depth of said curtain wall gradually diminishing from the bottom of said member where it is at a maximum to each of its two ends where it is at a minimum, said curtain wall being adapted to intercept drops of water rebounding from the lower part of the surface of said member in the direction of said spy glass, thereby keeping the same clear.

LAKE H. SPRINKLE.